(12) United States Patent
Chominski et al.

(10) Patent No.: US 10,404,503 B2
(45) Date of Patent: Sep. 3, 2019

(54) METHOD AND SYSTEM FOR MULTIPLEXING DOCSIS SIGNALS

(71) Applicant: Maxlinear, Inc., Carlsbad, CA (US)

(72) Inventors: Paul Chominski, Carlsbad, CA (US); Sridhar Ramesh, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 190 days.

(21) Appl. No.: 15/621,025

(22) Filed: Jun. 13, 2017

(65) Prior Publication Data

US 2018/0013595 A1 Jan. 11, 2018

Related U.S. Application Data

(60) Provisional application No. 62/359,908, filed on Jul. 8, 2016.

(51) Int. Cl.
*H04L 27/00* (2006.01)
*H04L 12/24* (2006.01)
(Continued)

(52) U.S. Cl.
CPC ...... *H04L 27/0008* (2013.01); *H04L 12/2856* (2013.01); *H04L 12/4625* (2013.01); *H04L 41/5054* (2013.01); *H04L 61/2015* (2013.01); *H04M 11/062* (2013.01); *H04N 21/42676* (2013.01); *H04N 21/6118* (2013.01); *H04N 21/6168* (2013.01); *H04Q 11/0421* (2013.01);
(Continued)

(58) Field of Classification Search
CPC ............. H04L 27/0008; H04L 12/4625; H04L 61/2015; H04L 41/5054; H04L 12/2856; H04Q 11/0421; H04Q 2213/1304; H04M 11/062; H04M 11/066; H04N 21/6118; H04N 21/6168
See application file for complete search history.

(56) References Cited

U.S. PATENT DOCUMENTS

2013/0061276 A1* 3/2013 Urban .................... H04N 7/106
  725/109
2014/0026176 A1* 1/2014 Ling .................. H04N 21/6118
  725/127
(Continued)

OTHER PUBLICATIONS

Li et al., A Fully Matched LTE-A Carrier Aggregation Quadplexer Based on BAW and SAW Technologies, 2014, ULTSYM. 2014. 0020 (Year: 2014).*

*Primary Examiner* — Hoang Vu A Nguyen Ba
(74) *Attorney, Agent, or Firm* — McAndrews, Held & Malloy, Ltd.

(57) ABSTRACT

Aspects of methods and systems for frequency multiplexing suitable for Data Over Cable Service Interface Specification (DOCSIS) are provided. A system for multiplexing signals according to frequency comprises a DOCSIS port interface, an upstream interface, a downstream interface, and a circulator subsystem. The DOCSIS port interface comprises a plurality of channel filters. The upstream interface is operably coupled to a first channel filter of the plurality of channel filters, and the downstream interface is operably coupled to a second channel filter of the plurality of channel filters. The circulator subsystem is able to direct a first signal from the upstream interface to the DOCSIS port interface and is able to direct a second signal from the DOCSIS port interface to the downstream interface.

40 Claims, 5 Drawing Sheets

(51) Int. Cl.
    *H04L 12/28*     (2006.01)
    *H04L 12/46*     (2006.01)
    *H04L 29/12*     (2006.01)
    *H04M 11/06*     (2006.01)
    *H04N 21/61*     (2011.01)
    *H04Q 11/04*     (2006.01)
    *H04N 21/426*    (2011.01)

(52) U.S. Cl.
    CPC ... *H04M 11/066* (2013.01); *H04Q 2213/1304* (2013.01)

(56) References Cited

U.S. PATENT DOCUMENTS

2014/0328220 A1* 11/2014 Khlat .................. H04B 1/0064
                                                               370/278
2018/0309464 A1* 10/2018 Mandegaran ............ H04B 1/52

* cited by examiner

METHOD AND SYSTEM FOR MULTIPLEXING DOCSIS SIGNALS

CROSS-REFERENCE TO RELATED APPLICATIONS

This patent application claims priority to and benefit from of the U.S. Provisional Patent Application No. 62/359,908, filed on Jul. 8, 2016. The above identified application is hereby incorporated herein by reference in its entirety

BACKGROUND

Limitations and disadvantages of conventional methods and systems for frequency multiplexing will become apparent to one of skill in the art, through comparison of such systems with some aspects of the present invention as set forth in the remainder of the present application with reference to the drawings.

BRIEF SUMMARY

Systems and methods are provided for a frequency multiplexer, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION

Data Over Cable Service Interface Specification (DOCSIS) is an international telecommunications standard that permits the addition of high-bandwidth data transfer to an existing cable TV (CATV) system. DOCSIS is employed by many cable television operators to provide Internet access over their existing hybrid fiber-coaxial (HFC) infrastructure. DOCSIS 3.1 was first released as a standard in October 2013. Comcast expects to make DOCSIS 3.1 available in a select number of cities by the end of 2016. DOCSIS 3.1 transmits data using orthogonal frequency-division multiplexing (OFDM) and supports at least 10 Gbit/s downstream and 1 Gbit/s upstream using 4096 QAM.

An improvement to DOCSIS 3.1 may utilize the full spectrum of the cable (0 MHz to 1.2 GHz). To boost the upstream data rates without significantly reducing the downstream data rates, a full duplex architecture is used.

Figure 1:
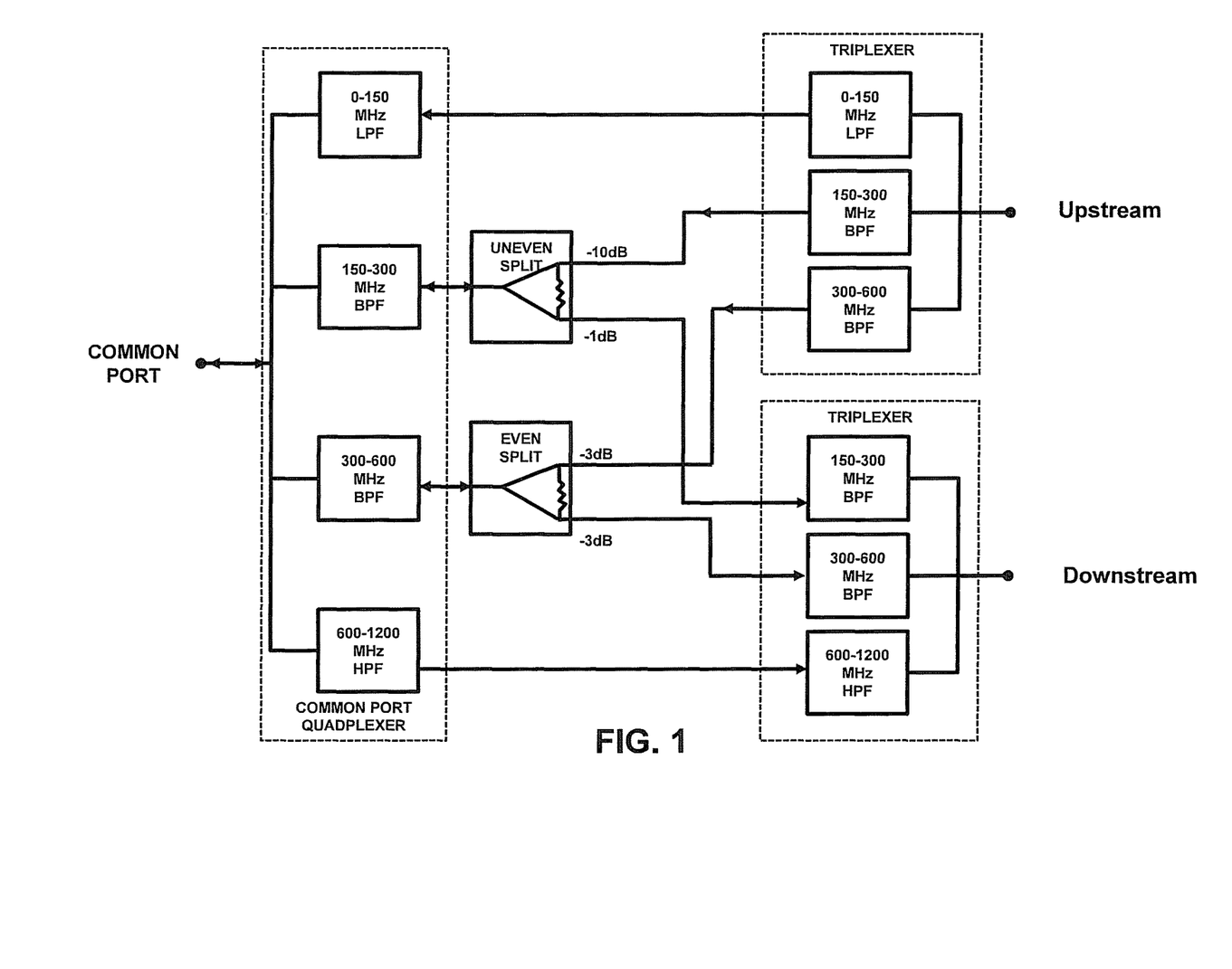
FIG. 1 shows a frequency multiplexer with splitters, in accordance with and example embodiment of the disclosure.

FIG. 1 shows a frequency multiplexer with splitters, in accordance with and example embodiment of the disclosure. FIG. 1 is a system comprising a quadplexer, a first splitter, a second splitter, a first triplexer, and a second triplexer. The quadplexer is operably connected to a common port and four channel ports, each of the four channel ports corresponding to a frequency range. The four frequency ranges may be non-overlapping in frequency or may be overlapping in frequency. Each of the four frequency ranges may correspond to an octave, wherein the highest frequency of the range is twice the lowest frequency of the range. A frequency response between the common port and a channel port may have a low-pass filter response, a band-pass filter response, or a high-pass filter response. When the frequency response between the common port and a channel port has a low-pass filter response, the highest frequency of the frequency range associated with the channel port corresponds to a low-pass corner frequency. When the frequency response between the common port and a channel port has a band-pass filter response, the highest frequency of the associated frequency range corresponds to an upper pass-band edge and the lowest frequency of the associated frequency range corresponds to a lower pass-band edge. When the frequency response between the common port and a channel port has a high-pass filter response, the lowest frequency of the associated frequency range corresponds to a high-pass corner frequency.

In a first mode, the common port of the quadplexer receives a downstream signal and is operable to separate the downstream signal into a plurality of downstream channel signals. In a second mode, the quadplexer combines a plurality of upstream channel signals to produce an upstream signal at the common port. Note, the number and size of frequency bands in the quadplexer may be different without deviating from the scope of the disclosure herein.

The first triplexer is operably connected to an upstream composite port and three upstream channel ports, each of the three upstream channel ports corresponding to one of the four frequency ranges. A frequency response between the upstream composite port and an upstream channel port may have a low-pass filter response, a band-pass filter response, or a high-pass filter response, as described above with reference to the quadplexer. Note, the number and size of frequency bands in the first triplexer may be different without deviating from the scope of the disclosure herein.

The second triplexer is operably connected to a downstream composite port and three downstream channel ports, each of the three downstream channel ports corresponding to one of the four frequency ranges. A frequency response between the downstream composite port and a downstream channel port may have a low-pass filter response, a band-pass filter response, or a high-pass filter response, as described above with reference to the quadplexer. Note, the number and size of frequency bands in the second triplexer may be different without deviating from the scope of disclosure herein.

As illustrated in FIG. 1, three out of the four frequency ranges correspond to downstream channels; three out of the four frequency ranges correspond to upstream channels; and two out of the four frequency ranges correspond to both upstream channels and downstream channels. In these two bi-directional channels, full duplex communication is possible. Full duplex communication may be achieved using one or more techniques. For example, upstream and downstream may share a channel using time division, frequency division, and/or code division. Alternatively or additionally, upstream and downstream may share a channel using interference cancellation. For example, the upstream signal is known by the upstream source, and, therefore, the upstream signal may be removed from a shared channel before the downstream signal is processed at the upstream source.

As illustrated in FIG. 1, the two bi-directional channel ports from the quadplexer may be split. Power may be split evenly or unevenly between the upstream and the downstream. Splitters may be designed from ferrite transformers.

At the upper splitter of FIG. 1, the upstream signal in the 150-300 MHz channel is reduced by 10 dB, whereas the downstream signal in the 150-300 MHz channel is reduced by only 1 dB. At the lower splitter of FIG. 1, the upstream and downstream signals in the 300-600 MHz channel are both reduced by 3 dB. The power distribution of FIG. 1 is also illustrated below in Table 1.

TABLE 1

Frequency Plan

| Channel | Direction | Insertion Loss | Power Split |
|---|---|---|---|
| 0-150 MHz | Upstream | 0 dB | |
| 150-300 MHz | Upstream | 10 dB | Uneven |
| | Downstream | 1 dB | |
| 300-600 MHz | Upstream | 3 dB | Even |
| | Downstream | 3 dB | |
| 600-1200 MHz | Downstream | 0 dB | |

Splitters may add unwanted power loss and may not provide enough isolation between upstream and downstream signals. Circulators may be used to increase the isolation. For example, some circulators may provide 30 dB of isolation for narrow band signals and 20 dB of isolation for wideband signals. The passband of some circulators may cover one octave. The operation of a circulator Out Of Band (OOB) may be less controlled. Standard circulators are designed for $Z_0$=50 Ohm. Circulators may also be designed for an impedance other than 50 Ohm (e.g., 75 Ohm). Filters may be used to match this impedance. Isolation of the circulator depends on the impedance at the ports.

Figure 2:
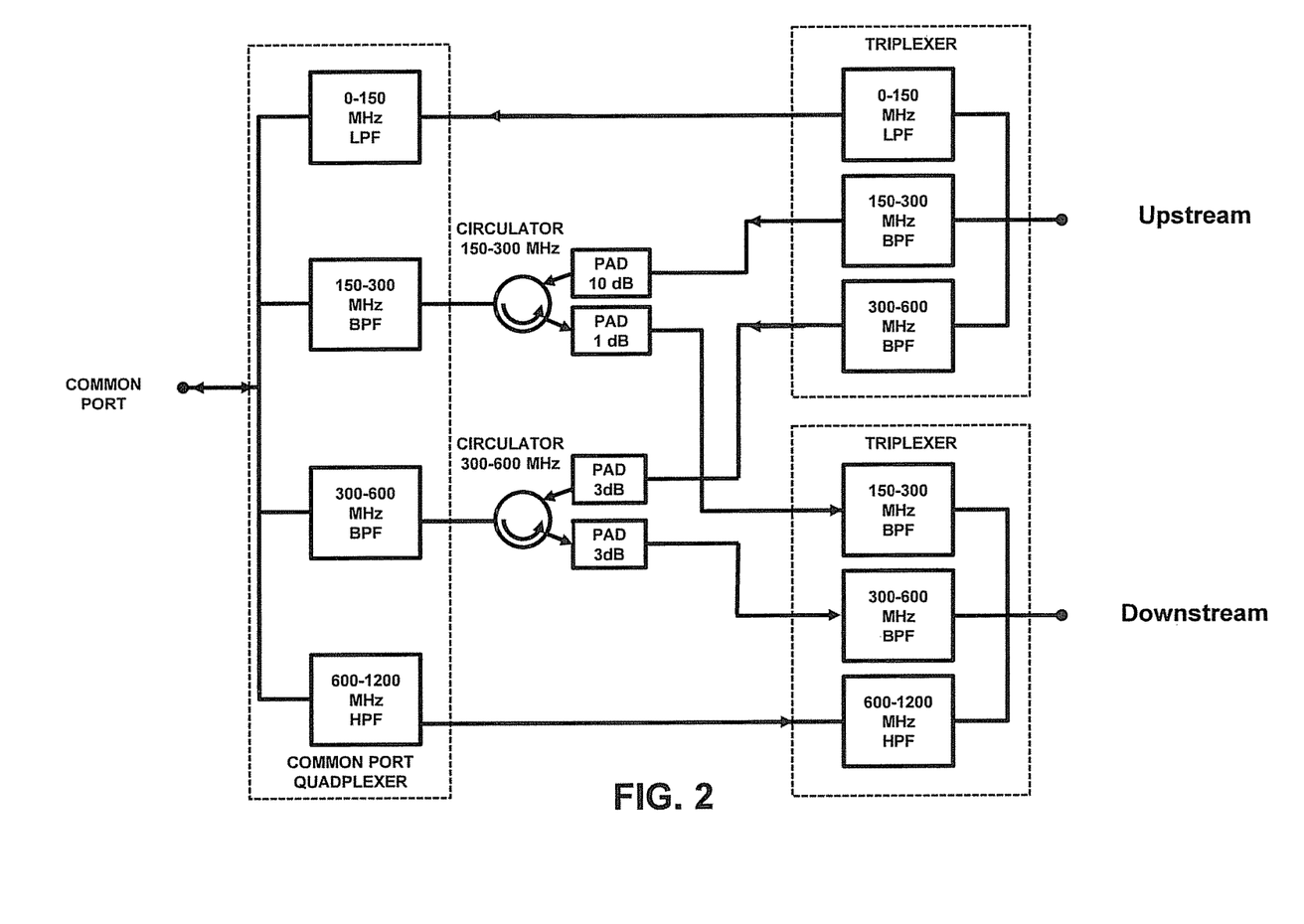
FIG. 2 shows a frequency multiplexer with circulators, in accordance with and example embodiment of the disclosure.

FIG. 2 shows a frequency multiplexer with circulators, in accordance with and example embodiment of the disclosure. Like FIG. 1, FIG. 2 is a system comprising a quadplexer, a first triplexer, and a second triplexer. However, instead of a first splitter and a second splitter, FIG. 2 uses a first circulator and a second circulator to isolate the two bi-directional channel ports from the quadplexer. As illustrated in FIG. 2, the first circulator operates in the 150-300 MHz channel, and the second circulator operates in the 300-600 MHz channel. Where different channel power may be desired, a pad may be added. For example, the 10 dB pad and the 1 dB pad at the first circulator in FIG. 2 will provide the same (uneven) insertion loss as the first splitter in FIG. 1. The 3 dB pads at the second circulator in FIG. 2 will provide the same (even) insertion loss as the second splitter in FIG. 1.

Figure 3:
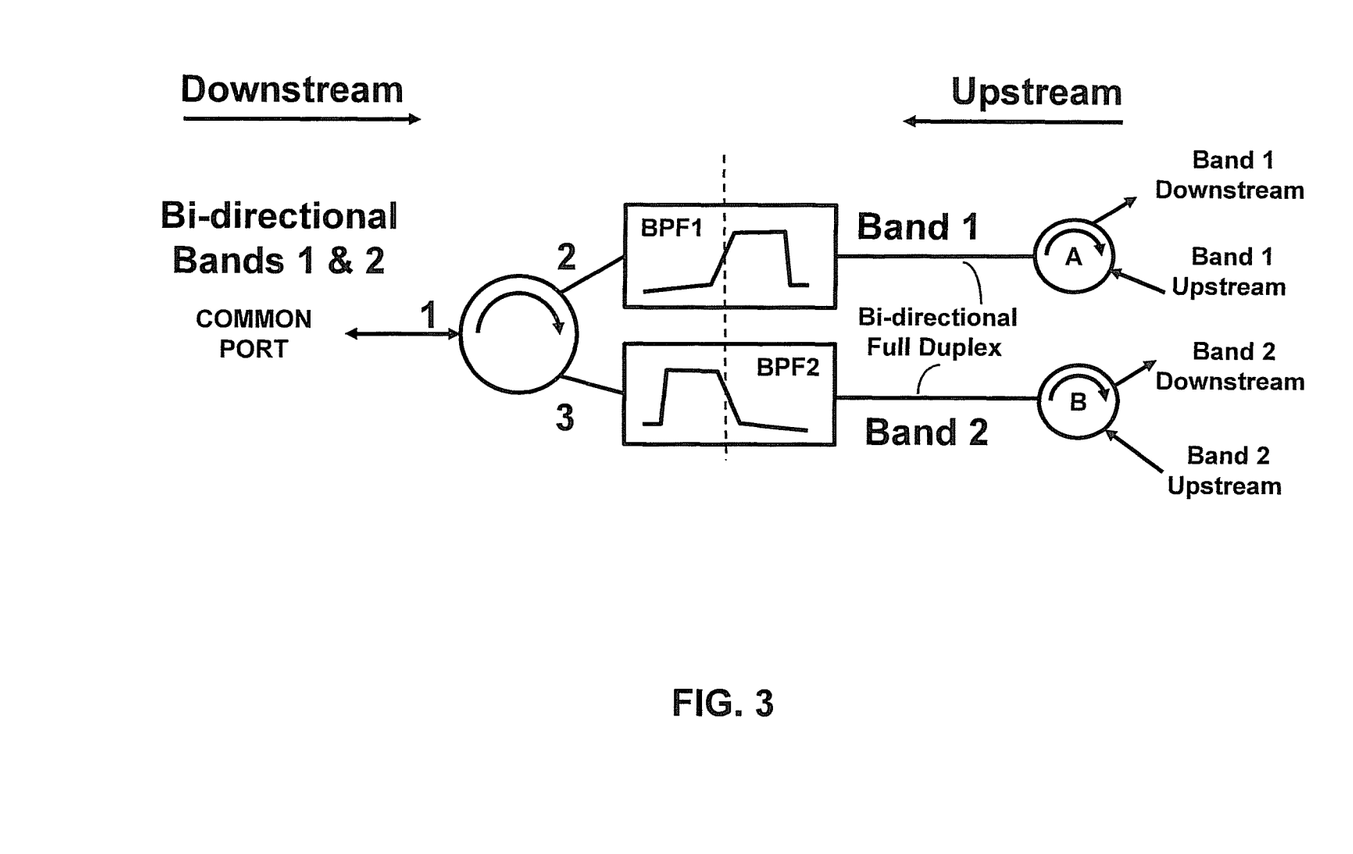
FIG. 3 shows a combination of filters using and circulators, in accordance with and example embodiment of the disclosure.

FIG. 3 shows a combination of filters and circulators, in accordance with and example embodiment of the disclosure. The signal flow through FIG. 3 is described in Table 2 below. The circulators separate the upstream signals from the downstream signals and the filters add additional channel selectivity.

TABLE 2

Channel Separation

| Channel | Direction | Signal Path |
|---|---|---|
| Band 1 | Downstream | 1→2→BPF1 → circulator A |
| | Upstream | circulator A → BPF1 → 2→3→BPF2 reflects → 3 → 1 |
| Band 2 | Downstream | 1→2→BPF1 reflects →2→3 → BPF2 → circulator B |
| | Upstream | circulator B → BPF2 passes → 3 → 1 |

Figure 4:
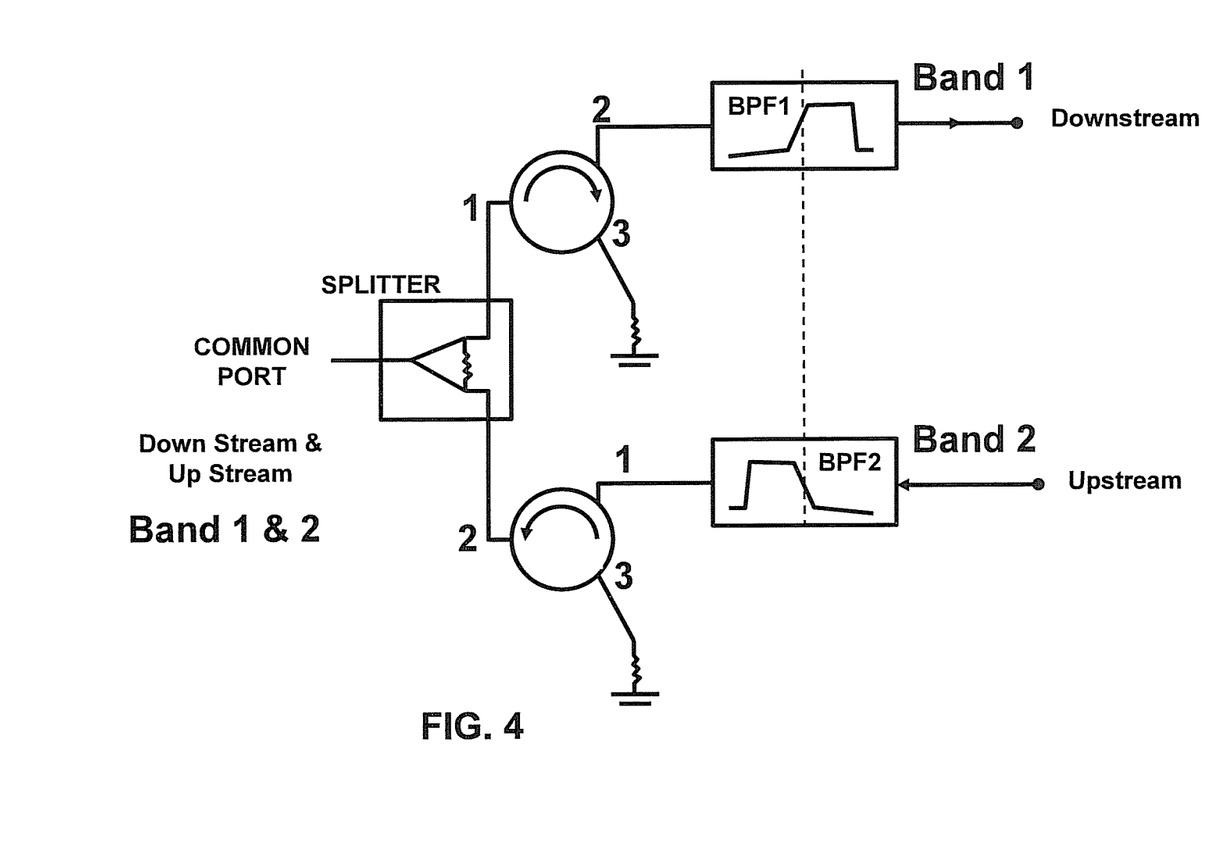
FIG. 4 shows a combination of filters using isolators, in accordance with and example embodiment of the disclosure.

FIG. 4 shows a combination of filters using isolators. With a matched load connected to one port, a circulator acts as an isolator. If a port may carry bidirectional signals, the isolators in FIG. 4 select either the upstream signal or the downstream signal. For example, a common port signal may carry bidirectional signals that cover multiple frequency bands. As illustrated in FIG. 4, the common port signal is split into a top signal and a bottom signal. The top signal passes through a first circulator that isolates the downstream signal. This downstream signal may then be filtered by BPF1. The bottom signal passes through a second circulator that isolates the upstream signal. This upstream signal may then be filtered by BPF2. Note, the first circulator and the second circulator may be arranged to isolate signals of the opposite direction. Also, any filter selectivity may be used for BPF1 and BPF2.

Figure 5:
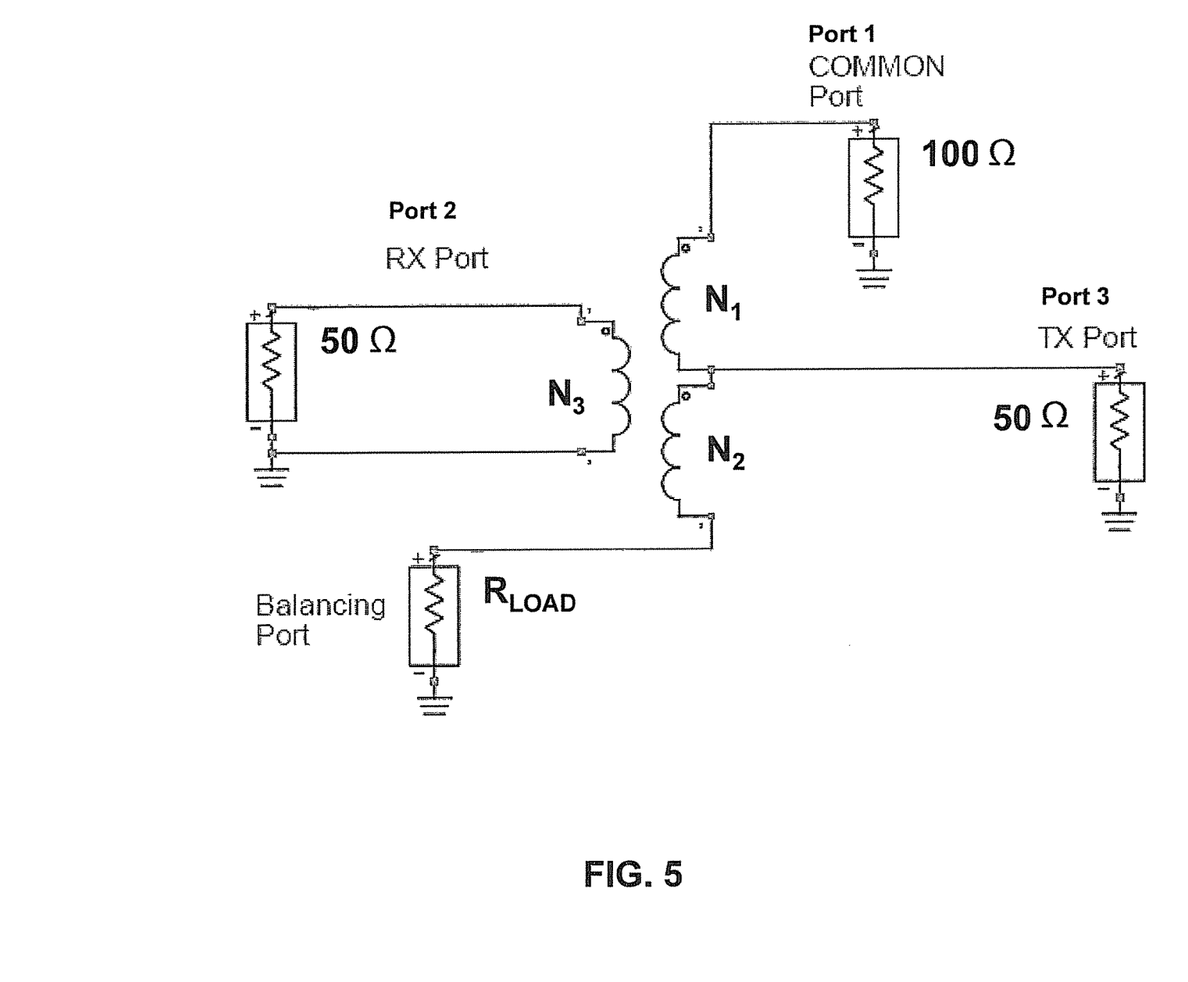
FIG. 5 shows a splitter/combiner using a transformer, in accordance with and example embodiment of the disclosure.

FIG. 5 shows a splitter/combiner using a transformer, in accordance with and example embodiment of the disclosure. The transformer in FIG. 5 may be a wideband transformer for low frequencies. The transformer may be wound on a ferrite core. The impedances in FIG. 5 are shown for equal number of turns (i.e., $N_1$=$N_2$=$N_3$). Other impedances may require a change in $N_1$, $N_2$, and/or $N_3$. Isolation between Port 2 and Port 3 may be adjusted by RLOAD. Power from Port 1 splits equally between Port 2 and Port 3. An uneven split may be achieved by changing $N_1$, $N_2$, and/or $N_3$.

While the disclosure is described with reference to DOCSIS and cable television systems, aspects of this disclosure are also applicable to other communication technologies as well (e.g., satellite, WiFi, cellular communications (including cellular backhaul systems), etc.).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for multiplexing signals, wherein the system comprises:
    a Data Over Cable Service Interface Specification (DOCSIS) port interface comprising a plurality of channel filters;
    an upstream interface operably coupled to a first channel filter of the plurality of channel filters;
    a downstream interface operably coupled to a second channel filter of the plurality of channel filters; and
    a circulator subsystem operably coupled to a third channel filter of the plurality of channel filters, the upstream interface and the downstream interface, wherein the circulator subsystem is operable to direct a first signal from the upstream interface to the DOCSIS port interface and direct a second signal from the DOCSIS port interface to the downstream interface, and wherein the circulator subsystem comprises:
        a splitter comprising a combined port, a first split port and a second split port;
        a downstream circulator comprising a first downstream circulator port, a second downstream circulator port, and a third downstream circulator port, wherein the first downstream circulator port is operably coupled to the first split port and the second downstream circulator port is operably coupled to the downstream interface; and
        an upstream circulator comprising a first upstream circulator port, a second upstream circulator port, and a third upstream circulator port, wherein the a first upstream circulator port is operably coupled to the upstream interface and the a second upstream circulator port is operably coupled to the second split port.

2. The system of claim 1, wherein the plurality of channel filters comprise a low pass filter, a band pass filter, and a high pass filter.

3. The system of claim 1, wherein a first insertion loss is added between the upstream interface and the circulator subsystem.

4. The system of claim 3, wherein a second insertion loss is added between the circulator subsystem and the downstream interface, the second insertion loss being less than the first insertion loss.

5. The system of claim 1, wherein the third downstream circulator port and the third upstream circulator port are grounded.

6. The system of claim 1, wherein the circulator subsystem comprises:
    a common circulator comprising a first common circulator port, a second common circulator port, and a third common circulator port, wherein the first common circulator port is operably coupled to the DOCSIS port interface;
    a low band circulator comprising a first low band circulator port, a second low band circulator port, and a third low band circulator port, wherein the first low band circulator port is operably coupled to the second common circulator, the second low band circulator port is operably coupled to the downstream interface, and the third low band circulator port is operably coupled to the upstream interface; and
    a high band circulator comprising a first high band circulator port, a second high band circulator port, and a third high band circulator port, wherein the first high band circulator port is operably coupled to the third common circulator, the second high band circulator port is operably coupled to the downstream interface, and the third high band circulator port is operably coupled to the upstream interface.

7. The system of claim 6, wherein a band pass filter is operably coupled between the second common circulator port and the first high band circulator port.

8. The system of claim 6, wherein a band pass filter is operably coupled between the third common circulator port and the first low band circulator port.

9. The system of claim 1, wherein circulator subsystem comprises:
    a low band circulator operably coupled to the DOCSIS port interface, the downstream interface, and the upstream interface; and
    a high band circulator operably coupled to the DOCSIS port interface, the downstream interface, and the upstream interface, wherein the high band circulator operates on higher frequency signals than the low band circulator.

10. A method for multiplexing signals, wherein the method comprises:
    receiving a first band of signals via a Data Over Cable Service Interface Specification (DOCSIS) port interface;
    coupling a first signal of the first band of signals to a downstream interface;
    directing a second signal of the first band of signals, via a circulator subsystem, to a downstream interface;
    receiving a second band of signals via an upstream interface;

coupling a first signal of the second band of signals to the DOCSIS port interface;
directing a second signal of the second band of signals, via the circulator subsystem, to the DOCSIS port interface;
coupling the DOCSIS port interface to a splitter of the circulator subsystem;
directing the second signal of the first band of signals, via a downstream circulator of the circulator subsystem, from the splitter to the downstream interface; and
directing the second signal of the second band of signals, via an upstream circulator of the circulator subsystem, from the upstream interface to the splitter.

11. The method of claim 10, wherein the DOCSIS port interface comprises a plurality of channel filters.

12. The method of claim 10, wherein the method comprises reducing the power of the second signal of the first band between the circulator circuit and the downstream interface.

13. The method of claim 10, wherein the method comprises reducing the power of the second signal of the second band between the upstream interface and the circulator circuit.

14. The method of claim 10, wherein the method comprises:
grounding a port of the downstream circulator; and
grounding a port of the upstream circulator.

15. The method of claim 10, wherein the method comprises:
coupling the DOCSIS port interface to a common circulator of the circulator subsystem;
directing the second signal of the first band of signals, via a low band circulator of the circulator subsystem, from the common circulator to the downstream interface; and
directing the second signal of the second band of signals, via the low band circulator of the circulator subsystem, from the upstream interface to the common circulator.

16. The method of claim 15, wherein the method comprises:
directing a third signal of the first band of signals, via a high band circulator of the circulator subsystem, from the common circulator to the downstream interface; and
directing a third signal of the second band of signals, via the high band circulator of the circulator subsystem, from the upstream interface to the common circulator.

17. The method of claim 15, wherein the method comprises:
filtering the second signal of the first band of signals between the common circulator and the low band circulator; and
filtering the second signal of the second band of signals between the common circulator and the low band circulator.

18. The method of claim 10, wherein the method comprises:
directing the second signal of the first band of signals, via a low band circulator of the circulator subsystem, to the downstream interface; and
directing a third signal of the first band of signals, via a high band circulator of the circulator subsystem, to the downstream interface.

19. A system for multiplexing signals, wherein the system comprises:

a Data Over Cable Service Interface Specification (DOCSIS) port interface comprising a plurality of channel filters;
an upstream interface operably coupled to a first channel filter of the plurality of channel filters;
a downstream interface operably coupled to a second channel filter of the plurality of channel filters; and
a circulator subsystem operably coupled to a third channel filter of the plurality of channel filters, the upstream interface and the downstream interface, wherein the circulator subsystem is operable to direct a first signal from the upstream interface to the DOCSIS port interface and direct a second signal from the DOCSIS port interface to the downstream interface, and wherein the circulator subsystem comprises:
a common circulator comprising a first common circulator port, a second common circulator port, and a third common circulator port, wherein the first common circulator port is operably coupled to the DOCSIS port interface;
a low band circulator comprising a first low band circulator port, a second low band circulator port, and a third low band circulator port, wherein the first low band circulator port is operably coupled to the second common circulator, the second low band circulator port is operably coupled to the downstream interface, and the third low band circulator port is operably coupled to the upstream interface; and
a high band circulator comprising a first high band circulator port, a second high band circulator port, and a third high band circulator port, wherein the first high band circulator port is operably coupled to the third common circulator, the second high band circulator port is operably coupled to the downstream interface, and the third high band circulator port is operably coupled to the upstream interface.

20. The system of claim 19, wherein the plurality of channel filters comprise a low pass filter, a band pass filter, and a high pass filter.

21. The system of claim 19, wherein a first insertion loss is added between the upstream interface and the circulator subsystem.

22. The system of claim 21, wherein a second insertion loss is added between the circulator subsystem and the downstream interface, the second insertion loss being less than the first insertion loss.

23. The system of claim 19, wherein a band pass filter is operably coupled between the second common circulator port and the first high band circulator port.

24. The system of claim 19, wherein a band pass filter is operably coupled between the third common circulator port and the first low band circulator port.

25. The system of claim 19, wherein circulator subsystem comprises:
a low band circulator operably coupled to the DOCSIS port interface, the downstream interface, and the upstream interface; and
a high band circulator operably coupled to the DOCSIS port interface, the downstream interface, and the upstream interface, wherein the high band circulator operates on higher frequency signals than the low band circulator.

26. A method for multiplexing signals, wherein the method comprises:

receiving a first band of signals via a Data Over Cable Service Interface Specification (DOCSIS) port interface;

coupling a first signal of the first band of signals to a downstream interface;

directing a second signal of the first band of signals, via a circulator subsystem, to a downstream interface;

receiving a second band of signals via an upstream interface;

coupling a first signal of the second band of signals to the DOCSIS port interface;

directing a second signal of the second band of signals, via the circulator subsystem, to the DOCSIS port interface;

coupling the DOCSIS port interface to a common circulator of the circulator subsystem;

directing the second signal of the first band of signals, via a low band circulator of the circulator subsystem, from the common circulator to the downstream interface; and directing the second signal of the second band of signals, via the low band circulator of the circulator subsystem, from the upstream interface to the common circulator.

27. The method of claim 26, wherein the DOCSIS port interface comprises a plurality of channel filters.

28. The method of claim 26, wherein the method comprises reducing the power of the second signal of the first band between the circulator circuit and the downstream interface.

29. The method of claim 26, wherein the method comprises reducing the power of the second signal of the second band between the upstream interface and the circulator circuit.

30. The method of claim 26, wherein the method comprises:

directing a third signal of the first band of signals, via a high band circulator of the circulator subsystem, from the common circulator to the downstream interface; and directing a third signal of the second band of signals, via the high band circulator of the circulator subsystem, from the upstream interface to the common circulator.

31. The method of claim 26, wherein the method comprises:

filtering the second signal of the first band of signals between the common circulator and the low band circulator; and filtering the second signal of the second band of signals between the common circulator and the low band circulator.

32. The method of claim 26, wherein the method comprises:

directing the second signal of the first band of signals, via a low band circulator of the circulator subsystem, to the downstream interface; and directing a third signal of the first band of signals, via a high band circulator of the circulator subsystem, to the downstream interface.

33. A system for multiplexing signals, wherein the system comprises:

a Data Over Cable Service Interface Specification (DOCSIS) port interface comprising a plurality of channel filters;

an upstream interface operably coupled to a first channel filter of the plurality of channel filters;

a downstream interface operably coupled to a second channel filter of the plurality of channel filters; and a circulator subsystem operably coupled to a third channel filter of the plurality of channel filters, the upstream interface and the downstream interface, wherein the circulator subsystem is operable to direct a first signal from the upstream interface to the DOCSIS port interface and direct a second signal from the DOCSIS port interface to the downstream interface, and wherein the circulator subsystem comprises:

a low band circulator operably coupled to the DOCSIS port interface, the downstream interface, and the upstream interface; and a high band circulator operably coupled to the DOCSIS port interface, the downstream interface, and the upstream interface, wherein the high band circulator operates on higher frequency signals than the low band circulator.

34. The system of claim 33, wherein the plurality of channel filters comprise a low pass filter, a band pass filter, and a high pass filter.

35. The system of claim 33, wherein a first insertion loss is added between the upstream interface and the circulator subsystem.

36. The system of claim 35, wherein a second insertion loss is added between the circulator subsystem and the downstream interface, the second insertion loss being less than the first insertion loss.

37. A method for multiplexing signals, wherein the method comprises:

receiving a first band of signals via a Data Over Cable Service Interface Specification (DOCSIS) port interface;

coupling a first signal of the first band of signals to a downstream interface;

directing a second signal of the first band of signals, via a circulator subsystem, to a downstream interface;

receiving a second band of signals via an upstream interface;

coupling a first signal of the second band of signals to the DOCSIS port interface;

directing a second signal of the second band of signals, via the circulator subsystem, to the DOCSIS port interface;

directing the second signal of the first band of signals, via a low band circulator of the circulator subsystem, to the downstream interface; and directing a third signal of the first band of signals, via a high band circulator of the circulator subsystem, to the downstream interface.

38. The method of claim 37, wherein the DOCSIS port interface comprises a plurality of channel filters.

39. The method of claim 37, wherein the method comprises reducing the power of the second signal of the first band between the circulator circuit and the downstream interface.

40. The method of claim 37, wherein the method comprises reducing the power of the second signal of the second band between the upstream interface and the circulator circuit.

* * * * *